Sept. 1, 1970 M. CAMRAS 3,526,725

ELECTROMAGNETIC TRANSDUCER HEAD WITH PLURAL MAGNETIC CIRCUITS, GAPS AND WINDINGS

Original Filed July 24, 1961 5 Sheets-Sheet 1

INVENTOR.
Marvin Camras

BY Hill, Sherman, Meroni, Gross & Simpson
ATTORNEYS

INVENTOR.
MARVIN CAMRAS

BY Hill, Sherman, Meroni, Gross & Simpson ATTORNEYS

INVENTOR.
Marvin Camras
BY
Hill, Sherman, Meroni, Gross & Simpson
ATTORNEYS

INVENTOR.
Marvin Camras
BY Hill, Sherman, Meroni, Gross & Simpson
ATTORNEYS

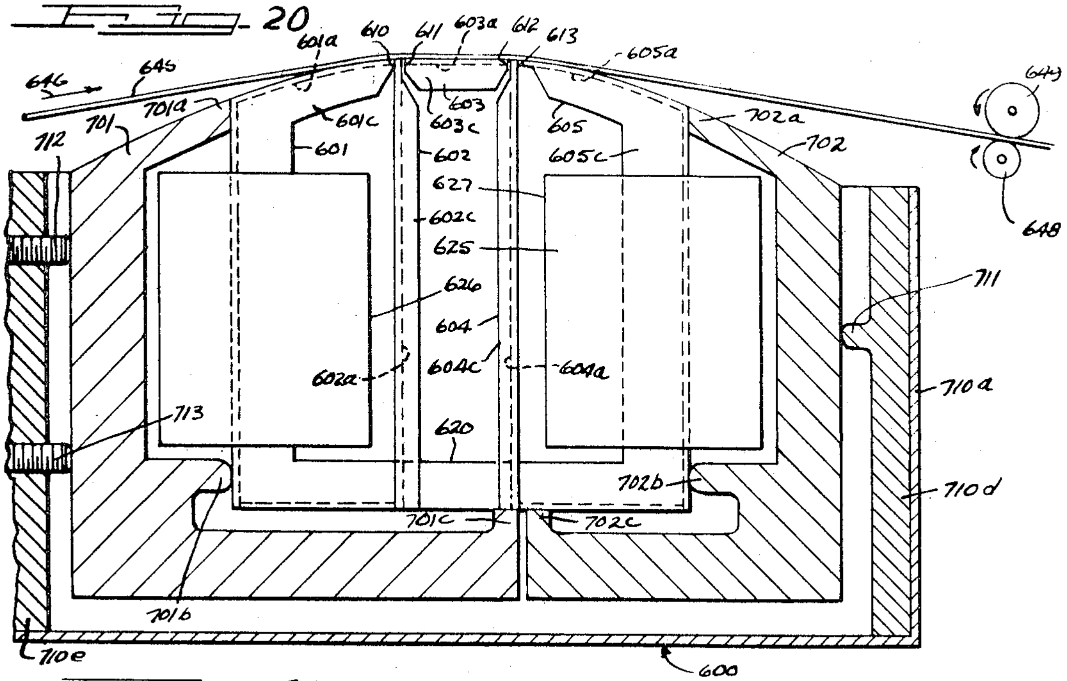
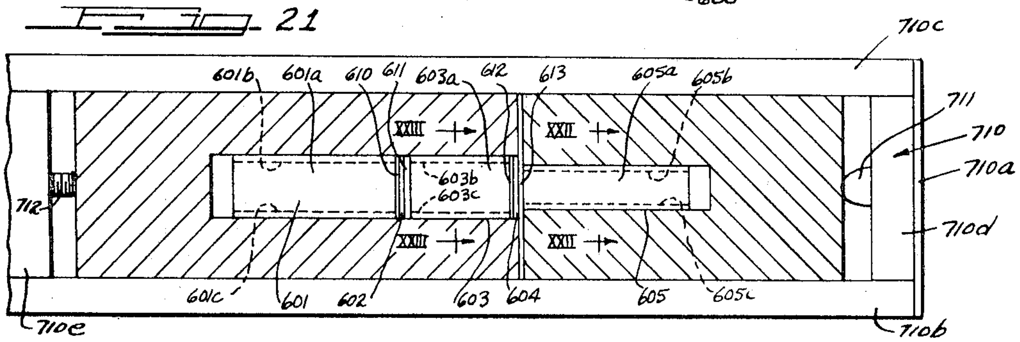
FIG. 24
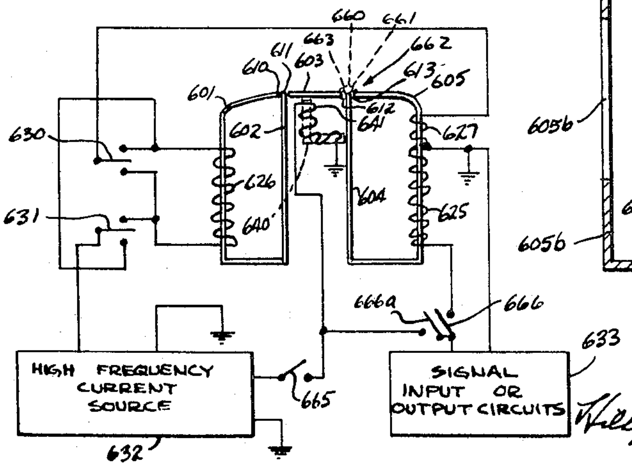
FIG. 22
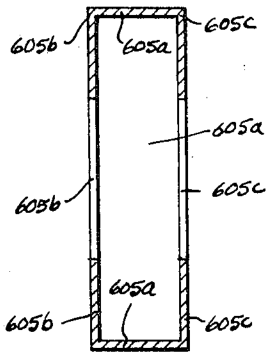
FIG. 23
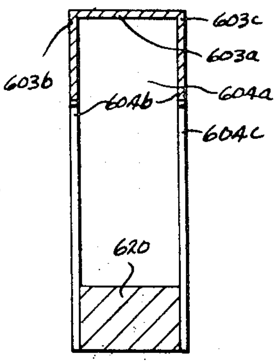
INVENTOR.
Marvin Camras
BY
Hill, Sherman, Meroni, Gross & Simpson
ATTORNEYS United States Patent Office 3,526,725

Patented Sept. 1, 1970

3,526,725

ELECTROMAGNETIC TRANSDUCER HEAD WITH PLURAL MAGNETIC CIRCUITS, GAPS AND WINDINGS

Marvin Campas, Glencoe, Ill., assignor to Armour Research Foundation of Illinois Institute of Technology, Chicago, Ill., a corporation of Illinois Original application July 24, 1961, Ser. No. 126,121, now Patent No. 3,334,192, dated Aug. 1, 1967. Divided and this application June 12, 1967, Ser. No. 645,114

Int. Cl. G11b *5/10, 5/20, 5/26*

U.S. Cl. 179—100.2 13 Claims

ABSTRACT OF THE DISCLOSURE

A high resolution transducer head comprises channel cross section core parts providing increased flux carrying capacity with low eddy current loss; auxiliary relatively unstressed magnetic material associated with the core parts further increases flux carrying capacity and reduces the susceptibility of the head to residual magnetization. Playback heads are shown with plural windings of different size and/or linked to different magnetic circuits of the head for improved or corrected frequency response.

CROSS-REFERENCES TO RELATED APPLICATIONS

Reference is made in compliance with the requirement of 35 U.S.C. 120 to my copending application Ser. No. 126,121 filed July 24, 1961, now U.S. Pat. No. 3,334,192 issued Aug. 1, 1967. The present application is a continuing application based on U.S. Ser. No. 126,121 and contains claims divided from said application. The original disclosure of Ser. No. 126,121 is incorporated herein, and is to be used to correct any discrepancies between the present disclosure and that of Ser. No. 126,121.

BACKGROUND OF THE INVENTION

An important problem in the magnetic recording art relates to the need for higher resolution transducer heads which enable lower scanning speeds at a reasonable cost. Such transducer heads are particularly desired for fixed (non-rotating) head magnetic recording and playback systems where low cost is a basic objective.

SUMMARY OF THE INVENTION

It is therefore an object of the present invention to provide an improved transducer head for magnetic recording and playback systems, and an improved method for making such a head.

Another object of the invention is to provide a relatively inexpensive transducer head having a stable gap dimension of 50 microinches or less.

A further object of the invention is to provide a transducer head in accordance with one or more of the foregoing objects also having a particularly low susceptibility to residual magnetization.

A still further object of the invention is to provide a magnetic transducer head providing a stable high resolution gap dimension in spite of temperature changes.

Another and further object of the invention is to provide a relatively inexpensive readily manufactured magnetic head assembly for magnetic transducer systems.

Still further objects of the invention relate to methods for producing head assemblies having the characteristics previously expressed and which methods are particularly simple and inexpensive and lend themselves to efficient quantity production.

A further feature of the preferred embodiment resides in the provision of a metal casing for the transducer head made of a material having a thermal expansion coefficient similar to that of the core material of the head to provide a more stable gap configuration.

Other objects, features and advantages of the present invention will be apparent from the following detailed description taken in connection with the accompanying drawings.

BRIEF DESCRIPTION OF THE DRAWINGS

FIG. 20 is a diagrammatic vertical sectional view of a further embodiment of magnetic transducer assembly;

FIG. 21 is a horizontal sectional view of the assembly of FIG. 20;

FIGS. 22 and 23 are vertical sectional views taken along the lines XXII—XXII and XXIII—XXIII, respectively, in FIG. 21;

FIG. 24 is a diagrammatic view showing an electric circuit for the embodiment of FIGS. 20–23.

DESCRIPTION OF THE PREFERRED EMBODIMENTS

Figure 1:
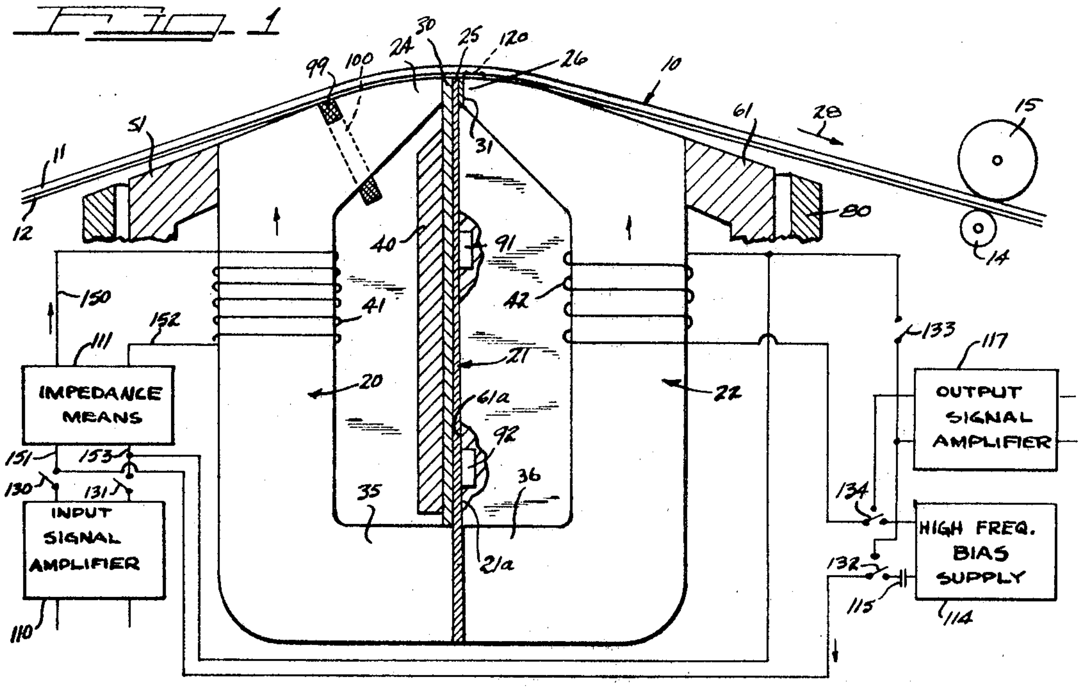
FIG. 1 is a somewhat diagrammatic vertical cross sectional view of a magnetic transducer head construction in accordance with the present invention and illustrating suitable circuit components connected to the windings of the head for carrying out recording and playback operations.
Figure 2:
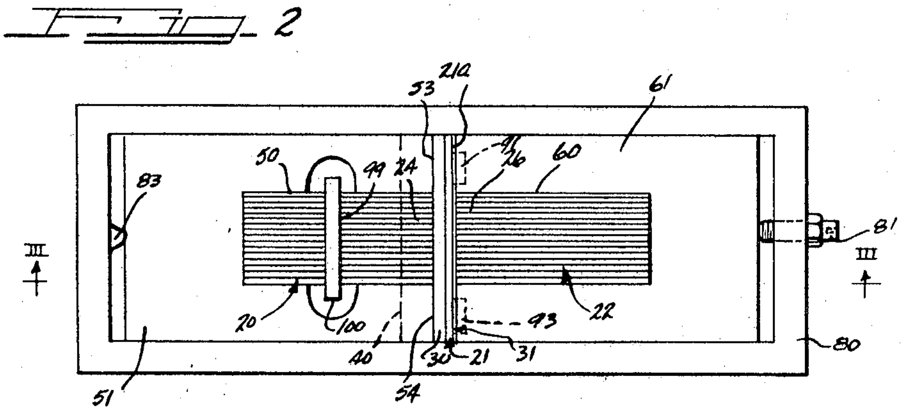
FIG. 2 is a somewhat diagrammatic top plan view of the structure of FIG. 1.
Figure 3:
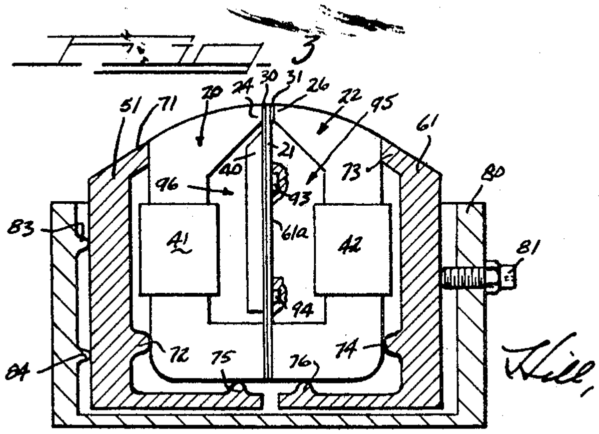
FIG. 3 is a somewhat diagrammatic vertical cross-sectional view taken along the line III—III of FIG. 2 and illustrating the manner in which the two halves of the head assembly may be cemented together without detriment to the non-magnetic gap therebetween.

FIGS. 1, 2 and 3 illustrate a magnetic transducer head assembly for recording signals on a magnetic record medium 10 and for electrically reproducing the signals previously recorded on the record medium by the head assembly. By way of example and not of limitation, the record medium 10 may be in the form of a magnetic tape having a non-magnetic base 11 and a magnetizable layer 12 comprising a suitable magnetizable powder dispersed in a suitable non-magnetic binder. By way of example, the tape record medium 10 may be supplied from a supply reel (not shown) moved across the head assembly by means of a capstan roll 14 and pressure roll 15 at a constant speed and then wound upon a take-up reel (not shown). The present head assembly is particularly adapted to provide distortionless low frequency response without the sacrifice of high frequency response at low speeds such as 1⅞ inches per second or below. Similar benefits are obtained at higher tape speeds, however.

The transducer head assembly comprises a magnetic core with three legs 20, 21 and 22 having polar extremities 24, 25 and 26 across which the record medium 10 successively travels as it moves in the direction of the arrow 28. A relatively long gap between the extremities or poles 24 and 25 may be rigidly defined by means of a strip 30 of copper or other suitable electrically conductive non-magnetic material. A second relatively fine gap between poles 25 and 26 may be provided by a gap spacer 31 which may be of copper or other suitable metallic non-magnetic material. By way of example, the non-magnetic strip 30 may comprise a strip of copper having a thickness of .002 inch in the direction of travel of the record medium, the magnetic center leg 21 may comprise a sheet of "Deltamax" (50% nickel and the remainder iron and minor constituents), "Carpenter 49" (49% nickel and the remainder iron and minor constituents), "4–79 Molybdenum Permalloy" (4% molybdenum, 79% nickel and the remainder iron and minor constituents), or "Supermalloy" (5% molybdenum, 79% nickel and the remainder iron and minor constituents), and the gap spacer 31 may comprise a copper strip of .0001 inch or .00005 inch thickness in the direction of movement of the record medium. Where especially high flux-carrying capacity is desired during recording, leg 21 may be made of a cobalt-iron alloy such as "Supermendur." Where especially good initial permeability is desired during playback, leg 21 may be made of "Supermalloy." It may also be made of layers, some of which impart high flux capacity, and others high initial permeability.

In the illustrated embodiment, the outer legs 20 and 22 of the magnetic core have inturned lower end portions 35 and 36 which are spaced apart to receive the lower end of the sheet 21 of magnetic material. Beryllium copper is preferred for the spacer members 30 and 31.

A sheet 40 of non-magnetic conductive material may be secured to the gap spacer 30 and extend centrally of the core to provide further shielding between core legs 20 and 21 and may have a thickness in the direction of movement of the tape of .005 inch. A piece of high permeability material, preferably laminated may be placed along and in contact with leg 21 beginning at a point spaced well below pole 26 to increase the flux carrying capacity of leg 21.

Windings 41 and 42 are wound on the core parts 20 and 22, and the core part 20 which may be made up of a stack of laminations of magnetic material is inserted in a receiving groove 50 of a casing part 51. The gap spacer sheet 30 may be suitably secured to the faces 53 and 54 of the casing 51 and to the planar face of pole portion 24. The center pole sheet 21 may then be suitably secured to the outer surface of the gap spacer member 30 for example by means of a thin layer of a suitable cement. Similarly the leg 22 of the core may comprise a stack of generally C-shaped laminations and may be placed in a suitable recess 60 of a casing part 61. The casing parts 51 and 61 may be of a suitable non-magnetic material having substantially the same coefficient of expansion as the magnetic material of core legs 20 and 22; for example, the coefficient of expansion of nickel-iron cores containing 79% nickel is about $12.5\times10^{-6}$; for cores of 50% nickel content it is about $9.5\times10^{-6}$. Non-magnetic stainless steel having a coefficient of about $10\times10^{-6}$, and Monel metal with a coefficient of $14\times10^{-6}$ may be used for the case. A closer match is possible with special alloys. The casing parts 51 and 61 may engage the legs 20 and 22 at boss portions 71–76 for accurate three point positioning of each of the legs.

Thus, in assembling the head construction, a first sub-assembly is formed including the casing part 51 and core legs 20 and 21, while a second sub-assembly is formed including case part 61 and core leg 22. The polar faces of poles 26 and 26 are then polished to optical flatness, and the two sub-assemblies are placed in mating relation with spacer strip 31 therebetween. The completed unit may then be placed in a suitable frame 80, FIG. 3, which may serve as a shield, with a set screw such as indicated at 81 acting on the casing part 61 and cooperating bosses such as indicated at 83 and 84 acting on the casing part 51 to press the two sub-assemblies toward each other. The polar faces of poles 25 and 26 are thus urged against opposite sides of gap spacer 31. Alternatively, a wedge may be used instead of set screw 81.

The two sub-assemblies are preferably cemented together at their mating surfaces such as indicated at **21*a* and 61*a* in FIG. 1 by suitable means such as a cement to prevent side shift between the two sub-assemblies. Where the gap spacer 31 has a thickness dimension of .0005 inch or less, the cement may be placed in a recess or recesses such as indicated at 91 and 92 in FIG. 1 adjacent mating faces 61*a* of casing part 61. Further recesses may be located as indicated at 93 and 94 in FIGS. 2 and 3. This prevents the build up of any additional spacing between poles 25 and 26** for extremely fine gap thicknesses.

The present invention further contemplates leaving air spaces at 95 and 96 in the final head assembly so that there is no problem of expansion or swelling with heat or humidity which would open the fine gap between poles 25 and 26 as would be the case if these spaces were filled with epoxy resin or the like. Any cement which is used, for example between the bosses 71–76 and the legs 20 and 22 is in a thin layer which cannot appreciably affect the gap dimension.

An erase gap may be located as indicated at 99 and may be energized by a coil such as indicated at 100 in FIG. 1 or by a single conductor of cross section corresponding to the gap space 99 and extending therethrough. Such a conductor may form a closed circuit around leg 20 at 100 to obtain its energy from coil 41.

In the embodiment of FIG. 1, an input signal amplifier 110 or other input signal supply means is connected to the winding 41 either directly or through a suitable impedance means 111. The impedance means 111 has particular significance during the playback operation of the assembly but in some instances may be used during recording. It may be desirable to adjust the phase relationship between the cross field and main bias field during recording and this may be accomplished by component 111. A high frequency bias supply component 114 is illustrated for connection to the windings 41 and 42 in series during the recording operation. A by-pass capacitor 115 is illustrated for transmitting bias frequency current which may have a frequency of 20 kc. to 300 kc. or higher, for example, while blocking signal frequency current. It will be observed that the windings 41 and 42 are connected in series across the high frequency bias supply component 114 and that the windings are connected in series opposing relation with respect to the magnetic circuit including core legs 20 and 22. By way of example, the winding 41 may have 250 turns where the winding 42 has 42 turns. The high frequency bias current flowing in windings 41 and 42 may be such as to produce a bias field at the region of pole portion 26 in the path of tape 10 which diminishes much more rapidly as a function of distance from the gap 31 in the direction of tape movement than the bias field produced by winding 42 between poles 25 and 26 considered by itself. This phenomenon has been explained in detail in my prior Pats. No. 2,628,285 issued Feb. 10, 1953 and 2,803,708 issued Aug. 20, 1957. The field pattern produced with the winding arrangement and connections just described would correspond to that shown in FIG. 3 of Pat. No. 2,803,708 and provide a more uniform bias field through the thickness dimension of the magnetizable layer 12, a bias field at the trailing pole 26 is more nearly longitudinal in character with respect to the direction of movement of the record medium and one having a very rapidly decaying magnetic intensity in the region of the trailing pole 26. In fact, such a field configuration has a null point near the gap 31 above the trailing pole 26 where the leakage field from pole 24 produced by winding 41 effectively cancels the main bias field between poles 25 and 26 which is produced by winding 42.

While in certain embodiments of said previous Pat. No. 2,803,708, the high frequency field between poles corresponding to poles 24 and 25 in FIG. 1 was sufficient intensity to erase a saturation signal or the record medium, in the present instance, the high frequency field between poles 24 and 25 ordinarily has an intensity less than the saturation field intensity for the material of the record medium and is not of an intensity to insure erasure of record medium 10. This is a result of the present construction where the distance between the X-field gap and the following signal gap is equal to or less than the size of the X-field gap.

In the illustrated embodiment, the lower frequency signal current is supplied only to the winding 41 and serves to provide an effective recording field between poles 24 and 26 which is of substantially constant strength in the effective recording region above pole 26 indicated by the rectangle 120 where the bias field rapidly decays to an insignificant intensity. Thus the recording signal field due to the signal current in winding 41 persists substantially at a full strength value as the bias field falls off in intensity beyond the gap 31 in the path of the magnetizable layer of the record medium 10. This results in the recording of a signal of greater intensity on the record medium for a given value of signal current in winding 41 than would be the case if the signal current were also supplied to winding 42, or were supplied to a signal winding on leg 22 only. This recording arrangement with signal current supplied to winding 41 only provides substantially as good resolution as would be obtained where the cross field principle is applied both to the bias and signal frequencies. The arrangement is superior to the case where the signal current is supplied to a winding on leg 22, since it provides a higher magnetization level on the tape record; a greater recording sensitivity, because a given signal field will magnetize the record more strongly; and freedom from recording demagnetization where the bias field may partially erase a high frequency recording before this recording has left the gap field, and where the signal field does not reinforce the recording.

During playback, in one form of the present invention, one winding 42 only may be directly connected to the output signal amplifier 117. This corresponds to the case where switch means 130, 131 are in open condition, switch 132 is in its intermediate open circuit position as shown in FIG. 1, switch 133 is closed and switch 134 is in its upper position. This arrangement provides an operable playback system utilizing the same head configuration as utilized during recording but under some conditions has been found to provide less than optimum frequency response characteristics since at certain recorded wavelengths, the portion of the magnetizable layer 12 bridging the gap 30 will set up a stray flux in the magnetic circuit including legs 20 and 22 and linking winding 42 in advance of the time when this recorded signal element of the magnetizable layer reaches the correct playback region. The result is that at certain frequencies a cancellation effect is produced reducing the output from the single coil 42 during playback. While this phenomenon might not be detrimental for certain applications and in certain frequency ranges, and while various external circuit expedients could be utilized for compensating for this effect, it has been found preferable to utilize at least a part of the winding 41 for inducing a counteracting voltage in response to stray flux from the record medium and to utilize circuit means for introducing this cancelling voltage at the output signal amplifier 117 so as to counteract the effect of the stray pick-up phenomenon in winding 42.

In one approach to this problem windings 41 and 42 are connected in series opposing relation across the terminals of the output signal amplifier 117, this condition being produced by opening switch 133 and placing switches 132 and 134 in their upper positions. If the impedance means 111 is omitted and lines 150 and 151, and 152 and 153 are directly connected respectively, perfect cancellation may not result since the number of turns for winding 41 has been selected to optimize the recording function rather than for best cancellation. On the other hand, optimum cancellation may also be achieved utilizing a winding 41 of the proper number of turns for recording by proper selection of the impedance means 111. By way of example, impedance means 111 may take the form of a potentiometer having its outer fixed terminals connected to lines 150 and 152 and having its movable contact connected with line 151, line 153 connecting directly with line 152, for example. With this arrangement, adjustment of the potentiometer adjusts the value of voltage supplied from winding 41 to the output signal amplifier 117 for optimum cancellation of the spurious voltage induced in winding 42. During recording, the potentiometer may be by-passed and not used. Another way to use the head of FIG. 1 for playback is to connect coil 41 in series aiding relation with respect to coil 42 through a low pass filter at 111. The long wavelengths will then generate additive voltages in windings 41 and 42 to give enhanced low frequency response. At higher frequencies represented by shorter wavelengths, only the output from winding 42 is effective so that a minimum of interference results. This mode of operation is especially desirable where stray coupling between gap 30 and winding 42 is low. The low pass filter at 111 may also be used during recording to enhance low frequency recording by coil 41.

In the embodiment of FIG. 1, the non-magnetic strip 30 may terminate above the confronting lower end portions 35 and 36 of legs 20 and 22, the legs 20 and 21 then being placed in magnetic contact with each other in this region. Filler strips of non-magnetic material may be inserted between end portion 35 and the low part of magnetic sheet 21 to vary the reluctance of the magnetic circuit including legs 20 and 21 and its coupling to the leg 22.

With respect to the embodiment of FIG. 1, assuming the impedance means 111 comprises a potentiometer having its outer fixed terminals connected to lines 150 and 152 and having its movable contact terminal connected to line 153, the potentiometer may be adjusted to a value during playback which will minimize the discontinuities which occur when only the winding 42 is utilized to generate the playback signal.

Figure 18:
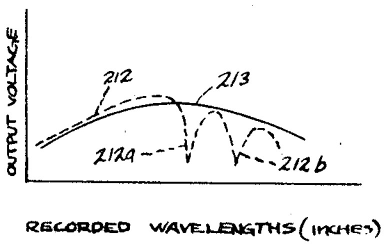
FIG. 18 shows in dotted outline a plot of output voltage as a function of recorded wavelength for the case of a multigap playback head having a pair of closely spaced gaps using a playback winding on the trailing pole piece, and shows in solid outline a similar plot for a playback head such as shown in FIG. 1.

FIG. 18 shows a curve 212 representing the output voltage from winding 42 as a function of recorded wavelength on the tape 10 in the absence of any circuit means for compensating for the stray flux interference effect. It will be observed from FIG. 18, that when a recorded half wavelength is approximately equal to the separation between the magnetic centers of gaps 30 and 31, the signal at gap 31 of the head will generate a voltage of one polarity in the winding 42, while the signal at gap 30 may produce a stray flux linking winding 42 and producing a voltage of opposite polarity at the winding 42. The stray voltage induced in winding 42 in this manner produces a cancellation effect at this value of recorded wavelength as indicated by dip **212*a* in the response curve 212. Similar but less significant dips occur at sub-multiples of this critical recorded wavelength, a further dip being indicated at 212***b* in the response curve 212 of FIG. 18.

Since the stray flux linking winding 42 which produces these discontinuities also links winding 41, it is possible to utilize a voltage divider across winding 41 during playback to select a correct value of voltage to exactly cancel the effect of the stray flux in the winding 42. It is evident that the correct adjustment of the voltage divider can be determined by experiment by first obtaining a response curve such as indicated at 212 in FIG. 18, then observing the critical recorded wavelength where the main discontinuity occurs, and by then adjusting the voltage divider to restore normal output from the head while a tape having the critical recorded wavelength travels across the head. When the first dip 212*a* in the original curve has been eliminated in this manner, the setting of the voltage divider then obtained is found to provide a frequency response curve such as indicated at 213 in FIG. 18. It will be observed that for recorded wavelengths greater than the critical wavelength illustrated, FIG. 18, flux is produced in the circuit including legs 20 and 22 predominantly, and an opposing voltage is thus induced in winding 41 at these low frequencies. This opposing voltage, however, does not substantially affect the frequency response characteristics of the head as will be apparent from a comparison of curves 212 and 213. At substantially higher recorded wavelengths, it will be understood that the gap 30 is relatively ineffective to produce a voltage in winding 41, and thus it will be understood that connection of the winding 41 in series opposing relation to the winding 42 during playback will not appreciably affect the high frequency response of the head.

Thus, it is possible to smooth out the frequency response characteristics of the head by the utilization of an opposing winding on leg 20 during playback. Various additional circuits for accomplishing this same result are illustrated in FIGS. 4 through 11 and will now be described to illustrate additional examples of circuitry for accomplishing a smooth frequency response characteristic as illustrated by curve 213 in FIG. 18.

With reference to the embodiment of FIG. 1, for example, if impedance means 111 takes the form of a low pass filter, windings 41 and 42 may be connected in series aiding relation during playback whereupon the two windings still produce aiding voltages in response to low frequency magnetic signal flux linking the magnetic circuit including legs 20 and 22. The head will thus provide increased output at low frequencies. At higher frequencies including those corresponding to the critical recorded wavelengths, the voltage induced in winding 41 will be blocked in the low pass filter 111 and will not appear at output signal amplifier 117.

During recording, the low frequency components of the input signal from amplifier 110 will be transmitted through low pass filter 111 to winding 41 while higher signal frequency and bias frequency will be blocked and not reach winding 41. If desired, during recording, bias supply 114 may be connected directly to winding 41 so that bias frequency is supplied to windings 41 and 42 in series as in previously described alternatives.

The core constructions for the embodiments of FIGS. 4 through 11 may be identical to that described in connection with FIGS. 1 through 3, and the description of FIGS. 1 through 3 is incorporated by reference with respect to each of the embodiments of FIGS. 4 through 11. The parts shown in FIGS. 1 through 3, but not shown in FIGS. 4 through 11 have been omitted simply for clarity of illustration and it is intended that the embodiments of FIGS. 4 through 11 include such parts.

Figures 4, 5, 6, 7, 8, 9, 10, 11:
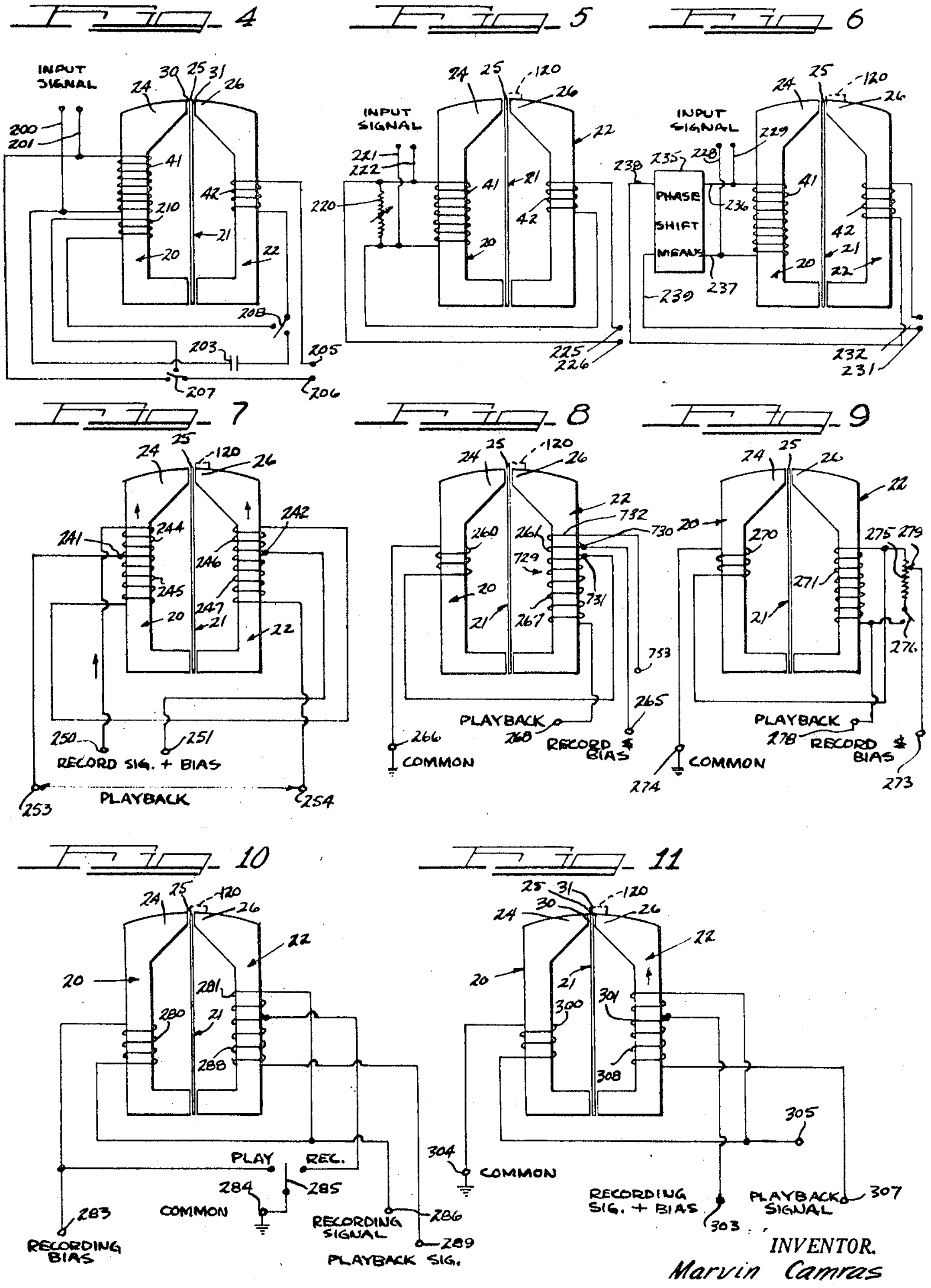
FIGS. 4 through 11 illustrate various circuit modifications for improving playback response in a combined record-playback transducer head assembly in accordance with the present invention.

In the embodiment of FIG. 4, during recording, signal current corresponding to the signal to be recorded is supplied at leads 200 and 201 to the winding 41 but is illustrated as being blocked from winding 42 by means of capacitor 203. High frequency bias current is supplied to the windings 41 and 42 in series from terminals 205 and 206 with switch 207 in its lower position and switch 208 in its lower position so that the high frequency bias field above pole 26 due to winding 41 instantaneously is 180° out of phase with respect to the bias field produced in the recording region by winding 42, as in the embodiment of FIG. 1.

During playback with the embodiment of FIG. 4, switches 207 and 208 are placed in their upper positions to connect a winding 210 on leg 20 in series opposing relation to winding 42 on leg 22 across terminals 205 and 206 which in this case constitute the signal output means and would be connected to an output signal amlifier such as component 117 in FIG. 1. The winding 210 has the correct number of turns for generating a cancelling voltage equal and opposite to the spurious voltage generated in winding 42 by stray flux linking the circuit including legs 20 and 22 at the frequencies where such stray flux otherwise produces an interference effect and introduces irregularities in the frequency response characteristics of the head.

By way of example, in designing a head as illustrated in FIG. 4, the playback response may first be observed with the winding 42 only connected to the playback amplifier. This response curve will be generally as indicated in FIG. 18 at 212 and will include discontinuities such as indicated at 212*a* and 212*b*. A further winding may now be placed on the leg 20 with a number of suitable taps so as to provide outputs from numbers of turns more than adequate to compensate for the effect and intermediate numbers of turns. The number of turns providing a smooth output curve as illustrated at 213 in FIG. 18 may then be determined by experiment. It is found that the additional winding 210 does not change the shape of the frequency response of the head to recorded wavelengths greater than the interference wavelength, and it is further found that the high frequency response of the head for wavelengths shorter than the interference wavelength also remains satisfactory. At long recorded wavelengths greater than the interference wavelength, the signal voltage in coil 210 due to pickup at gap 30 is in phase opposition to the signal voltage in coil 42 due to pickup at gap 31, and their summation produces a slight reduction in output. At very short wavelengths, the long gap 30 is inefficient (and may be made even more so by rounding its edges, or not having the gap edges straight and parallel); thus the opposing voltage generated in winding 210 is of such a low value as to have little effect on the overall response of the head. Further, the voltage generated in the winding 210 by flux generated in the circuit including legs 20 and 21 has been found not to substantially distort the output signal.

The embodiment of FIG. 5 illustrates the use of a variable resistor 220 as the impedance means represented by block 111 in FIG. 1. An input signal may be supplied from an input signal amplifier such as 110 in FIG. 1 via lines 221 and 222 during recording. Suitable switch means such as indicated at 130 and 131 in FIG. 1 may disconnect the input signal amplifier 110 from lines 221 and 222 during playback. The input signal to be recorded may be blocked from winding 42 by means of a capacitor in series with the bias supply such as capacitor 115 in FIG. 1, suitable switch means connecting the bias supply to terminals 225 and 226 during recording to supply high frequency bias current to the windings 41 and 42 in series and to produce high frequency magnetic fields in the recording region 120 which are 180° out of phase as in FIG. 1. By way of example, during recording, variable resistor 220 may be set to its maximum value so as to be effectively eliminated from the high frequency bias circuit.

During playback as in the previous embodiments, the bias supply and its capacitor 115 are effectively eliminated from the circuit, and the windings 41 and 42 are connected in series opposing relation across the terminals 225 and 226 which then constitute the signal output means and may be connected to the input of a suitable output signal amplifier such as 117 in FIG. 1. During playback, the variable resistor 220 is adjusted to the value which provides optimum frequency response of the head as indicated by curve 213 in FIG. 18 and eliminates the discontinuities such as indicated at 212*a* and 212*b* which are experienced when only the winding 42 is utilized during playback. It will be understood that once the correct value of variable resistor 220 has been determined for optimum playback response, a fixed resistor may be substituted of this optimum value and the resistor may be permanently connected across the winding 41. Alternatively, a fixed resistor of the optimum value may be connected across the winding 41 by means of a switch during playback and the switch may be opened to disconnect the resistor from across the winding 41 during recording. Where a variable potentiometer or other voltage divider is substituted for element 220, terminal 226 would be connected to the movable tap of the potentiometer instead of the upper fixed terminal of 220 in FIG. 5, during playback. Once the optimum setting has been determined for playback, two fixed resistors in series may be substituted for the potentiometer, and switch means incorporated for connecting the resistor corresponding to the desired voltage fraction in circuit with the winding 42 during playback. During recording, the fixed resistors may be switched out of the circuit, or may have such a total value as to have a negligible effect on the recording characteristics of the head. In the latter case, during recording, the winding 42 would be connected in series with a nework including both resistors of the voltage divider in parallel with the winding 41.

In FIG. 6, during recording, the input signal is supplied by lines 228 and 229 to winding 41 only and bias frequency current is supplied from terminals 231 and 232 to windings 41 and 42 in series. As in the previous embodiments, the high frequency bias fields produced by windings 41 and 42 may be 180° out of phase at the recording region 120. During playback, winding 41 is again connected in opposing relation with respect to winding 42 and a phase shift device 235 is interposed between lines 236, 237 and 238, 239 to introduce an optimum value of cancelling voltage at the output signal means 231, 232 as in the previous embodiments. The phase shift device 235 may be adjusted to give an optimum magnitude and phase of voltage at 238, 239 at the critical recorded wavelength to counteract the voltage component in 42 which produces dip 212*a* in FIG. 18. By way of example, the phase shift network may comprise an RC or an RL circuit. In either case, the values of the components of the network are selected for optimum cancellation to provide a smooth frequency response curve as indicated at 213 in FIG. 18.

The impedance means 111 of FIG. 1 may represent a potentiometer, a variable resistor such as 220 in FIG. 5 or a phase shift device such as 235 in FIG. 6 and may comprise components of fixed predetermined value which may be left in the circuit during recording, as well as during playback where their function is actually required.

In the embodiment of FIG. 7, the windings on legs 20 and 22 have taps as indicated at 241 and 242 which divide the windings into sections 244, 245 and 246, 247. During recording, the signal to be recorded together with the high frequency bias superimposed thereon is supplied to input terminals 250 and 251 to supply high frequency bias current to winding sections 244 and 245 on leg 20 and to winding section 246 on leg 22. The field produced by winding sections 244 and 245 is substantially 180° out of phase with the field produced by winding section 246 at the recording region 120 as in the previous embodiments. In this case, however, a sharp gradient is produced in the recording region 120 both for the signal field and the high frequency bias field. During playback winding section 245 on leg 20 is connected in series opposing relation to winding sections 246 and 247 on leg 22 to provide the compensated frequency response characteristic indicated at 213 at FIG. 18. Thus, recording winding section 246 may have 42 turns where winding sections 244 and 245 provide a total of 250 turns. Winding section 247 together with winding section 246 may provide an optimum number of turns for playback operation, as for example 1000 to 3000 turns when operated in the grid circuit of a vacuum tube amplifier, and winding section 245 may have a number of turns selected experimentally to properly compensate for the interference effects such as indicated at 212*a* and 212*b* in FIG. 18 exactly in the manner previously described for FIG. 4, for example. Terminals 250 and 251 constitute the signal and bias supply means in FIG. 7 while terminals 253 and 254 constitute the signal output means in this embodiment.

In the embodiment of FIG. 8, winding section 260 on leg 20 may have 250 turns where winding section 261 has 42 turns and these two winding sections may be connected in series aiding relation between terminals 265 and 266 with respect to the recording region 120. Both recording and bias frequency may be supplied to terminals 265 and 266 during recording to produce effective recording and bias fields in the recording region 120.

When connected for playback, the coils 260 and 267 are in series opposition, so that coil 260 generates a voltage that counteracts interfering pickup in winding 267 from the left hand gap. The number of turns on coil 267 may be chosen for proper matching to the playback amplifier. The turns on coil 260 are then chosen to minimize playback interference, and finally the coil 261 is chosen to have the number of turns relative to 260 so that adequate biasing action is obtained. Alternatively, coil 261 may be wound oppositely to the direction shown in FIG. 8 (opposite the direction of coil 267) in which case the main bias and recording fields will have a different phase relative to the cross fields from winding 260. Terminals 265 and 266 constitute the recording and bias supply means in this embodiment and terminals 268 and 266 constitute the signal output means. This embodiment is simple with regard to switching, head winding, and auxiliary components.

In the embodiment of FIG. 9, winding sections 270 and 271 are connected between the recording and bias supply terminals 273 and 274 under the control of a potentiometer 275 during recording. In this embodiment, winding sections 270 and 271 may have the correct numbers of turns to provide optimum playback operation as illustrated by curve 213 in FIG. 18 with switch 276 opened to disconnect potentiometer 275 from the circuit. The output signal is taken from playback terminals 278 and 274. During recording, the movable contact 279 of potentiometer 275 is moved to the position providing optimum recording operation. It will be understood that where winding 270 has 250 turns, winding 271 will have substantially more than the 42 turns which would provide optimum bias field configuration. The potentiometer 275 serves to effectively adjust the bias field produced by winding 271 to correspond to that which would be produced by a winding of a lesser number of turns directly in series with winding 270. The winding turns are illustrative only, since the number and proportion depend on gap sizes, pole piece dimensions, etc.

In the embodiment of FIG. 10, winding sections 280 and 281 are connected in series opposing relation with respect to recording region 120 between recording bias terminals 283 and 284 when switch arm 285 is in the record position. The recording signal applied to terminals 286 and 284 is applied only to the winding section 281 on leg 22 of the core. Where winding section 280 has 250 turns, for example, winding section 281 may have 42 turns to provide an optimum bias field configuration in the recording region 120.

During playback, winding section 288 is in series with winding sections 281 and 280 between playback terminals 289 and 284 with switch 285 in the play position. As in the previous embodiments, the total number of turns of sections 281 and 288 is related to the number of turns of section 280 to provide the response characteristics indicated at 213 in FIG. 18.

In the embodiment of FIG. 11, winding sections 300 and 301 are connected in series opposing relation between terminals 303 and 304 during recording and receive the signal to be recorded together with a superimposed high frequency bias to provide a sharp gradient in the longitudinal component of both the signal field and the bias field in the recording region 120 of the head. Alternatively, only the high frequency bias may be supplied between terminals 303 and 304, and the signal current may be supplied between terminals 303 and 305 to energize the winding section 301 only. As a further alternative, the recording signal may be supplied between terminals 305 and 304 to energize winding section 300 while the high frequency bias is supplied between terminals 303 and 304. In this latter instance, the signal field will not fall off with distance from gap 31 as rapidly as the high frequency bias field in the recording region 120.

During playback, the output amplifier may be connected between terminals 307 and 304 with winding section 308 added in series with winding section 301 on the leg 22 and with winding section 300 in series opposing relation to provide the desired frequency response characteristic indicated at 213 in FIG. 18.

In the embodiment of FIG. 11 winding section 300 is proportioned with respect to the total number of turns of winding sections 301 and 308 to neutralize the effect of stray magnetic flux from the record medium at gap 30 which is coupled into the magnetic circuit including leg 22 during playback. Coil section 301 is proportioned with respect to coil 300 to give the desired cross field at the bias frequency so that both the low frequency and high frequency signals can be recorded with the same optimum value of bias. This is achieved by producing a resultant bias field which is relatively uniform throughout the cross section of the magnetizable layer 12.

As a further alternative, it will be noted that the bias supply may be connected to terminals 305 and 304 in FIG. 11 and the signal supply connected between terminals 303 and 304 to produce a sharp gradient in the resultant signal field in the recording region 120 while providing a relatively uniform bias field in the recording region 120 which does not fall off in intensity as rapidly as the signal field.

A preferred recording embodiment in FIG. 11 is with the bias supplied to terminals 303 and 304, and the signal applied to 304 and 305, so that the signal field persists at substantial amplitude beyond the biased regions in the tape.

Figures 12, 14:
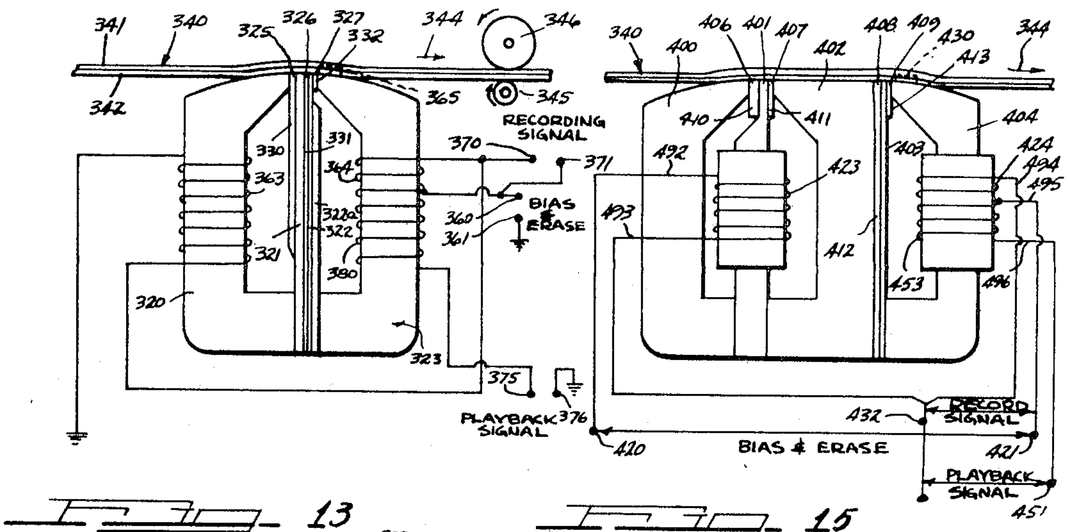
FIG. 12 illustrates an erase-record playback head assembly in accordance with the present invention.
FIG. 14 is a somewhat diagrammatic illustration of a further erase-record-playback transducer assembly in accordance with the present invention.
Figure 13:
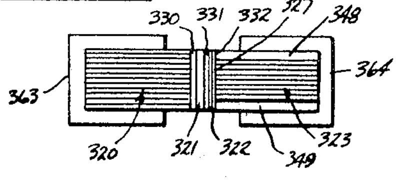
FIG. 13 is a somewhat diagrammatic top plan view of the assembly of FIG. 12.

FIGS. 12 and 13 illustrate an embodiment combining erase, record and playback functions in a single head construction wherein the erase gap is directly adjacent the recording playback gap to facilitate tracking of the tape over the successive gaps.

The head assembly of FIG. 12 includes a pair of C-shaped outer legs 320 and 323 and inner legs 321 and 322 defining successively an erase gap 325, a cross field gap 326 and a record playback gap 327. The gaps 325, 326 and 327 have respective electrically conductive non-magnetic strips 330, 331 and 332 therein.

By way of example, the erase gap spacer may have a thickness of .002 inch and be of copper strip material, pole member 321 may be of a laminated construction with the laminations extending transversely relative to the laminations making up the legs 320 and 323. The strip 321 may be of "Permalloy" and may comprise 78.5% nickel and the remainder iron and minor constituents. The gap spacer member 331 defining gap 326 may have a thickness of .001 inch and be of copper strip material. The next inner leg 322 may have a thickness of .0005 inch and be of "Permalloy" or other suitable magnetic material, and the gap spacer strip 332 defining gap 327 may have a thicknes of .00005 inch and also be of copper, preferably beryllium copper. Several additional shorter pieces of magnetic material such as "Permalloy" are indicated at 322a which lie against the leg 322 along the length thereof below the gap spacer 332, but do not extend up to the level of gap 327. The magnetic pieces 322a thus do not increase the spacing between gaps 326 and 327, but increase the flux carrying capacity of the magnetic circuit including legs 322 and 323.

A tape record medium is indicated at 340 having a non-magnetic base layer 341 and a magnetizable layer 342 consisting of a powdered magnetic material in a suitable non-magnetic binder. The tape may be driven in the direction of the arrow 344 by means of a capstan 345 and pressure roller 346 and be unwound from a supply reel (not shown) and wound upon a take-up reel (not shown) after travel across the successive gaps 325, 326 and 327. As seen in FIG. 13, the legs 320, 321 and 322 may have a width dimension transversely to the direction of movement of the tape substantially equal to the width of one channel on the tape 340, while the trailing leg 323 defining gap 327 has a reduced width and has a non-magnetic filler member of substantial thickness at each side thereof as indicated at 348 and 349 in FIG. 13. It will be noted that the spacing between the erase gap and the cross field gap in this embodiment may be only .002 inch so as to minimize the possibility of tracking errors as the tape moves from the erase gap 325 to the cross field gap 326 and record-playback gap 327. The close spacing of the gaps together with the reduced width of the effective record-playback gap insures that the erase gap 325 will erase all of the record medium which is coupled to the record-playback gap 327.

During recording, a high frequency bias and erase supply is connected between terminals 360 and 361 to energize winding sections 363 and 364 in series opposing relation with respect to the recording region 365. The high frequency current suplied to windings 363 and 364 is operative to produce an erasing magnetic field across gap 325 for insuring complete erasure of the record medium 340 before it reaches the record gap 327. Additionally, winding section 363 produces a high frequency field across gap 326 which may insure more complete erasure in conjunction with erase gap 325. Winding 363 also produces a high frequency field in the recording region 365 which effectively modifies the bias field produced by winding section 364 to provide a sharp gradient of bias field intensity in the recording region 365 as in the previous embodiments. The signal to be recorded may be supplied to terminals 370 and 371 to energize winding section 364.

During playback, a playback amplifier is connected between signal output terminals 375 and 376. Winding section 380 on leg 323 is in series with winding 364 during playback, and winding 363 is in series opposing relation with respect to winding sections 364 and 380 during playback as in the previous embodiments to provide the desired smooth frequency response curve indicated at 213 in FIG. 18.

Figure 15:
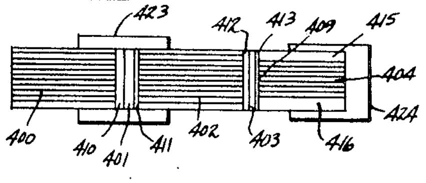
FIG. 15 is a somewhat diagrammatic top plan view of the structure of FIG. 14.

FIGS. 14 and 15 illustrate a combined-erase record-playback head utilizing two gaps in the erase head section. The head comprises a series of legs 400, 401, 402, 403 and 404 providing successive erase gaps 406 and 407, a cross field gap as indicated at 408 and a record-playback gap as indicated at 409. Gap spacers of electrically conductive non-magnetic material are indicated at 410, 411, 412 and 413 defining the successive gaps 406–409. By way of example, gap spacer 406 may comprise a strip of copper having a thickness of .003 inch, gap spacer 411 may comprise a copper strip having a thickness of .002 inch. The cross field gap spacer 412 may comprise a strip of copper having a thickness of .001 inch, leg 403 may comprise a sheet of "Permalloy" having a thickness of .0005 inch and gap spacer 413 may comprise a strip of copper having a thickness of .0001 inch. As in the embodiment of FIG. 12, the trailing leg 404 in FIG. 14 may have substantially less width than the other legs to define a narrower effective record-playback gap 409, and filler strips as indicated at 415 and 416 may be provided at each side of the leg 404 and are of substantial thickness in the direction transverse to the direction of tape movement indicated by arrow 344.

During recording, bias and erase high frequency current is supplied between terminals 420 and 421 to energize winding section 423 on leg 401 and winding section 424 on leg 404 in series opposing relation. This produces high frequency erase fields at gaps 406 and 407 and produces a high frequency field impinging on leg 404 at the recording region 430 opposing the bias field produced by winding 424 in this region. The recording signal may be supplied between terminals 432 adn 421 to energize coil 424 with the signal to be recorded. The high frequency bias field component from winding 423 acts to modify the bias field to provide a sharp gradient of bias field intensity in the recording region 430 as in the previous embodiments.

During playback, an output amplifier is connected between terminals 432 and 451 so as to connect a winding section 453 in series with winding section 424. In this case the winding 423 is not used during playback.

Figure 16:
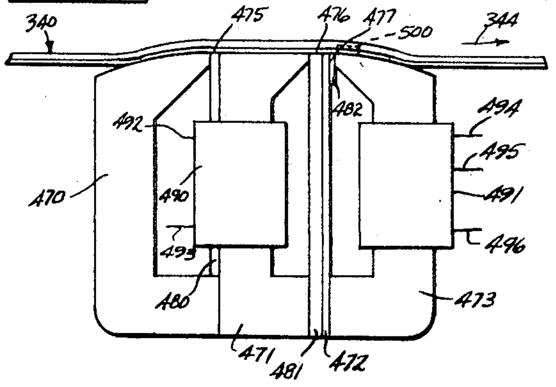
FIG. 16 is a diagrammatic illustration of an erase-record-playback head assembly representing a modification of the embodiment of FIG. 14.

In the embodiment of FIG. 16, the combined erase-record-playback head has legs 470, 471, 472 and 473 defining an erase gap 475, a cross field gap 476 and a record-playback gap 477. Erase gap spacer member 480 may comprise .0015 inch thick copper, cross field gap spacer 481 may comprise .004 inch thick copper, leg 472 may comprise .0005 inch "Permalloy," "Supermalloy," "Deltamax" or "Supermemdur," and gap spacer 482 defining gap 477 may comprise a strip of copper having a thickness of 0.00005 inch. Windings 490 and 491 on legs 471 and 473 may be connected in an electric circuit identical to that for the windings 423, 424 and 453 in FIG. 14 and corresponding reference numerals have been affixed to the respective leads in the two figures to indicate this fact. Thus leads 492 and 493 in FIG. 16 may connect to terminal 420 and terminal 432 of FIG. 14, respectively. Line 494 in FIG. 16 may connect to terminal 432, line 495 may connect to terminal 421 and line 496 may connect to terminal 451 of FIG. 14. As in the embodiments of FIGS. 13 and 15, the trailing leg 473 may have substantially less width than the other legs and may have filler members 498 and 499 of substantial thickness at the opposite sides thereof. The operation of the circuit for the embodiment of FIGS. 16 and 17 is the same as that for the circuit of FIGS. 14 and 15 with an erasing field being produced across the gap 475 for erasing the record medium 340 and the recording and playback functions taking place as in the embodiment of FIGS. 14 and 15.

Figure 17:
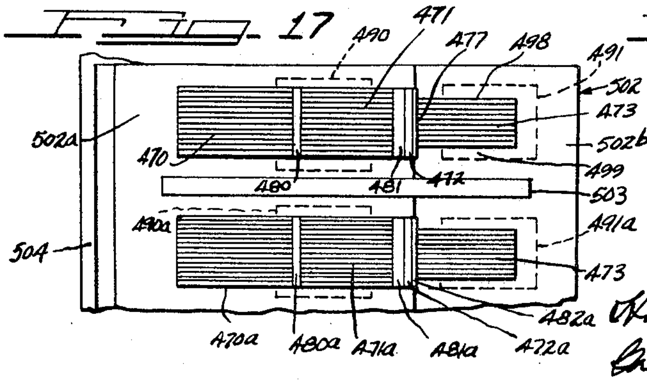
FIG. 17 is a somewhat diagrammatic top plan view of the structure of FIG. 16.

As indicated in FIG. 17, a housing 502 may receive a succession of head units such as shown in FIG. 16 with a shield of electrically conductive and/or magnetic material between successive head units as indicated at 503. The housing may be of electrically conductive non-magnetic material having a coefficient of expansion corresponding to that of the magnetic core material as in FIG. 1 and may be in two parts **502*a* and 502*b* similar to parts 51 and 61 in FIG. 1. A surrounding casing of magnetic shielding material may be provided as indicated at 504 similar to casing 80 in FIG. 3 and which clamps housing parts 502*a* and 502*b*** together in the same way as illustrated in FIG. 3. Corresponding reference numerals followed by the letter *a* designate parts of the second head unit corresponding to the respective parts of the head unit of FIG. 16.

Figure 19:
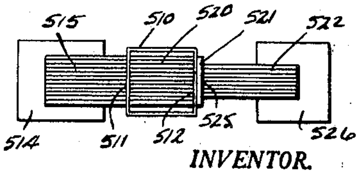
FIG. 19 is a diagrammatic top plan view of a head such as shown in FIGS. 12 and 13 which has been modified to have a closed electric circuit extending through the erase and cross field gaps.

FIG. 19 shows a head which may be identical to that of FIGS. 16 and 17, for example, except that a loop electric circuit 510 extends through erase gap 511 and cross field gap 512 and an erase-bias coil 514 is on an outer leg 515. The head includes legs 515, 520, 521 and 522 defining erase gap 511, cross field gap 512 and record-playback gap 525 with a bias and signal winding assembly 526 on leg 522 which may be connected with erase-bias coil 514 in the same way as indicated for windings 423 and 424, 453 in FIG. 14. By way of example, the loop electric circuit may have a width or height dimension of .020 inch and a thickness dimension of .002 inch. The loop electric circuit serves to increase the coupling of the erase-bias coil 514 to the cross field magnetic circuit including legs 520 and 522 which correspond to legs 471 and 473 in FIG. 16 during recording.

FIGS. 20 through 24 represent a preferred embodiment of the present invention wherein a magnetic transducer head 600 comprises a series of magnetic core parts 601, 602, 603, 604 and 605 defining erase gaps 610 and 611, a cross field gap 612 and a record-playback gap 613. A non-magnetic spacer 620 is interposed between the lower portions of core legs 602 and 604 to introduce a substantial reluctance in the magnetic circuit including legs 602, 603 and 605 and cross field gap 612 to tend to minimize the coupling of magnetic signal flux from the record medium at gap 612 to winding 625 during playback. It has been found that with a construction as in FIG. 20, distortion of the output from the signal winding 625 as a function of recorded wavelength (such as indicated in FIG. 18) is avoided. Thus the compensating means of the preceding embodiments is not required during playback with the embodiment of FIG. 20.

An erase frequency energizing coil 626 is on the leg 601 of the core and a bias winding 627 is on leg 605 along with signal winding 625. As indicated in FIG. 24, during recording switch arms 630 and 631 are closed in a downward position to supply high frequency current to erase winding 626 and bias winding 627 in series. A high frequency current source is indicated at 632 and a signal input or output circuits component is indicated at 633 connected with the signal frequency winding 625. The high frequency current is of course of a substantially higher frequency than the highest signal frequency component to be recorded. A further optional source of bias frequency magnetic field is indicated in FIG. 24, in dash outline as including a magnetic core part 640 and a winding 641 for producing a cross field in the region of recording gap 613. Winding 641 may be a coil on either leg of the L-shaped core 640. The spaces between the ends of core 640 and the adjacent core pieces 603 and 604 may be adjusted to minimize interference from pickup at gap 612, and also to set the level of the X-field relative to the small-gap field.

As indicated in FIG. 20, a tape record medium 645 may have its magnetizable layer in sliding contacting relation to the surfaces of legs 601, 602, 603, 604 and 605 which extend adjacent the tape path and the tape may be driven in the direction of the arrow 646 by means of a suitable constant speed drive including capstan member 648 and pressure roll member 649 so that the tape travels successively across the erase gaps 610 and 611, across cross field gap 612 and then across the record gap 613.

In this embodiment, rather than using laminated core parts which are relatively expensive and difficult to assemble to form a magnetic head, the core parts 601–605 may be formed from a flat sheet by a die into a U-cross section as indicated in FIGS. 22 and 23 and annealed after mechanical operations are completed. Each of the core parts thus has a generally planar body portion such as indicated at **603*a* and 605*a* in FIGS. 22 and 23 and has right angle flange portions such as indicated at 603*b* and 603*c* and 605*b* and 605*c*** in FIGS. 22 and 23. The thickness of sheet material from which the core is formed depends on the head dimensions and on the allowable eddy current losses. For a quarter track head, 0.043 inch wide, "Permalloy" stock 0.006 inch thick has proved very satisfactory. Heads of this construction have been used with bias frequencies of 100 kc. and have given satisfactory response to signals of 50 kc. and higher. Thicker material is suitable for lower frequencies or larger heads.

The body portions of the respective core parts have the widths indicated in FIG. 21, core parts 601, 602, 603 and 604 having a width substantially equal to the channel of the record tape 645 cooperating therewith while core part 605 has a substantially reduced width to insure complete erasure of the portion of the channel traveling across the record gap 613. A nominal width dimension for each recorded trace on four track stereo tapes is 0.043 inch. As seen in FIG. 20, the width of the side flanges 601*b*, 602*b*, 603*b*, 604*b* and 605*b* and 601*c*, 602*c*, 603*c*, 604*c* and 605*c* may taper at the regions of the gaps 610–613 so as to tend to concentrate flux in the path of the record medium 645. The configuration of the side flanges of core parts 603 and 604 adjacent gap 612 provides a very sensitive and convenient adjustment of the magnitude of the cross field component extending from core part 603 to the trailing side of the record gap 613. Thus, the more extended the area and the closer the relationship between the side flange parts 603*b* and 604*b* and 603*c* and 604*c*, where they meet at the gap 612, the smaller the magnitude of the cross field component adjacent gap 613.

By way of example, the pole pieces 601–605 may be of .005 inch thick "Permalloy" and may have an overall height in the plane of FIG. 20 of 0.5 inch. Pole piece 605 may have a width of .043 inch while pole pieces 601–604 may have a width of about .047 inch after forming into U cross section. Erasing gaps 610 and 611 may have a length in the direction of tape movement of .022 inch, each; cross field gap 612 may have a length in the direction of tape movement of .001 inch; and gap 613 may have a length in the direction of tape movement of .00005 inch. The magnetic tape layer thickness may be .0003 inch to .0005 inch. The body part 604*a* of pole piece 604 adjacent the tape path may be reduced in thickness compared to the remainder of the body portion and may have a thickness dimension in the direction of tape movement of .0005 inch, for example. Core parts 601–604 may have a width 10% to 20% greater than the width of core part 605, for example. It will be understood that the relatively intense high frequency field between core parts 603 and 604 across gap 612 may assist in the erasure of the record medium. Winding 626 also provides a cross field component in air between core parts 603 and 605. Coil 626 may have 1000 turns and coils 625 and 627 may comprise 1000 turns tapped at 48 turns and at 144 turns from the top. A high frequency bias current of 3.5 milliamperes at 100 kc. may be used to energize coil 626 and 96 turns of coil 625, 627 in series opposed connection with 626. A recording signal of 20 cycles to 20 kc. at 0.1 milliampere may be fed through coil 626 plus 144 turns of 625, 627, also series bucking. The channel construction described gives a self supporting pole piece having increased cross section by virtue of the lateral flanges, and low eddy current loss. The gap defining portions may be the same as the sheet thickness (for example 0.005 inch), requiring no machining. The core material is in an unstressed condition compared to laminations which are glued and clamped after anneal.

As indicated in FIG. 24, the embodiment of FIG. 20 includes the case where switch arms 630 and 631 are in their upper positions to supply a cross field component between core parts 603 and 605 in opposing relation at the trailing side of gap 613 and the case where the switch arms 630 and 631 are in their lower positions to generate a cross field component between core parts 603 and 605 which is substantially in aiding relation to the main bias field across gap 613 at the trailing side of the gap 613. The additive cross field arrangement with switch arms 630 and 631 in their lower positions provides results which under certain conditions compare quite favorably with the results obtained for an opposing cross field (with switch arms 630 and 631 in their upper positions). The signal cross field may also be additive in conjunction with opposing or additive bias cross field. It is believed that an important advantage achieved by the cross field is in providing a relatively uniform bias field intensity throughout the thickness of the magnetizable layer of the tape and either the additive or opposing cross field provides this advantage. Thus, an important concept is to provide a cross field component such as indicated at 660 in FIG. 24 bridging in air between core parts 603 and 605 and of magnitude in the recording region at the trailing side of the recording gap 613 approximating the bias amplitude required for optimum recording. Where there is a main bias field as indicated at 661 between core parts 604 and 605 produced by a winding such as indicated at 627, the cross field component as indicated at 660 produced by erase winding 626 should be at least of a substantial magnitude in comparison with the main bias field 661 in the recording region which has been indicated at 662. One suitable value in this case has been found to be a value of cross field component 660 equal to approximately ⅔ of the main field component 661 whether the cross field component is aiding or opposing the main field at the recording region 662. A further embodiment for the head of FIG. 20 involves the omission of the bias winding section 627. In this case, the erase winding 626 will produce a first generally semicircular field configuration 663 across gap 612, a second generally semicircular field configuration 661 across gap 613 and a cross field compenent such as 660 between core parts 603 and 605. In this case, of course, the cross field component 660 and the main field component 661 are additive in the recording region 662. Winding 627 may be omitted as a bias frequency winding by connecting the signal circuits component 633 across winding sections 625 and 627 together with the upper terminal of winding section 627 grounded rather than the upper terminal of winding 625 being grounded as shown in FIG. 24.

Of course, if winding 627 is omitted, a winding such as indicated at 641 may be energized by closing switch 665 during recording to increase the strength of the cross field component 660 and the main field component 661. In each of the above cases, switch 666 may be in its right hand position to supply recording signal current to winding section 625.

As a further alternative represented by the embodiment of FIG. 20, switch arm 666*a* may be in its left-hand position to supply signal recording current to winding 641 only (switch 665 being open or closed as desired) while the bias field components may be provided in any of the manners described. This configuration has the advantage of providing a more uniform signal field throughout the cross section of the magnetizable layer of the tape at low frequencies particularly. In effect, energization of winding 641 with signal current produces field components such as indicated at 660, 661 and 663 with the cross field component 660 additive with the main field component 661 in the recording region 662 the same as with a bias field configuration omitting winding 627. In any of the embodiments, playback may be obtained by moving switch 666 to its right-hand position and leaving switch means 665, 666*a*, 630 and 631 in their intermediate open positions shown in FIG. 24.

As another alternative, switch arms 666 and 666*a* may both be closed to provide a signal field at gap 613 due to winding 625 as well as a signal cross field from winding 641. These fields may be additive or opposing in region 662. Bias from source 632 is then supplied to both winding 641 and winding 625 with winding 627 omitted, and the bias cross field may be additive or opposing to the main bias field in region 662.

While A.C. bias has been mentioned in the above explanation because it is widely used, similar advantages are obtained with these structures when D.C. bias is used. The structures are also applicable where bias is not used.

While in FIGS. 20–24, a channel or U cross section has been specifically shown for core parts 601–605, other cross sections will produce the advantages of larger flux carrying capacity with low eddy current loss. For example, the core parts may have an L cross section. A generally spiral cross section may also be formed in an initially flat sheet by bending the sheet at right angles at successively increasing intervals. In this case the sheet would be flat between successive right angle bends. The adjacent parallel portions of the sheet are suitably insulated to avoid forming a closed loop electric circuit for eddy currents.

The core parts 601–605 may also have a generally O cross section with flat sides similar to one convolution of the spiral type cross section. The free edges of the magnetic sheet formed into an O cross section would have a non-conductive gap therebetween to avoid a closed loop electric circuit for eddy currents.

An O cross section may also be formed by nesting the lateral flanges of a pair of oppositely directed strips of channel cross section. The adjacent overlapping lateral flanges of the respective strips would be insulated from each other to avoid forming a closed loop electric circuit for eddy currents about the perimeter of the O cross section.

As a further example, a series of channel cross section strips of different size and all oriented in the same way may be nested one within the other to form a large area C cross section. A channel or C cross section type core leg may have a solid cross section non-magnetic filler nested therein to rigidify the leg. The filler may be non-conductive or insulated from the core leg to avoid formation of an electrically conductive loop path about the perimeter of the square or rectangular cross section defined by the leg and filler.

The spiral and O cross sections just described are advantageous over conventional laminated core parts because of their ease of assembly and relatively unstressed magnetic condition as finally assembled. The spiral and O cross section core parts are advantageous over solid cross section parts of comparable flux carrying capacity because of their reduced eddy current loss. The spiral and O cross sections provide more flux carrying capacity than a simple channel cross section, but are somewhat more difficult to fabricate and assemble. The non-magnetic filler provides increased rigidity over the simple channel cross section core part.

It will be understood that the housing shown in FIGS. 20 and 21 is substantially identical to that illustrated in FIG. 3 and comprises casing parts 701 and 702 engaging the respective core sections at points **701*a*, 701*b*, 701*c* and 702*a*, 702*b* and 702*c*, respectively. As in the embodiment of FIGS. 1–3, the casing parts 701 and 702 may be made of a non-magnetic metal having substantially the same thermal coefficient of expansion as the core parts 601–605. The casing parts 701 and 702 have interior air spaces so that there is no problem of expansion or swelling with heat or humidity which would tend to open the fine gap 613 as would be the case if these spaces were filled with epoxy resin or the like. Any cement which is used, for example between bosses 701*a*–701*c* and 702*a*–702*c*** and the core, is in a thin layer which cannot appreciably affect the gap dimension.

The casing parts 701 and 702 may have closely confronting mating surfaces with recesses therein such as indicated at 91–94 in FIGS. 1–3 for receiving a cement to retain the two sub-assemblies against relative lateral displacement. A housing 710 including plates **710*a*–710*c* of magnetic shielding material may surround the casing parts 701, 702. A housing plate 710*d* may have a boss portion 711 engaging one of the casing parts and a housing plate 710*e* may have set screw means such as indicated at 710 and 713 engaging the opposite casing part to press the casing parts together. The arrangement is such that the polar portions defining the gap 613** are pressed toward each other against the gap material intervening therebetween to precisely determine the gap spacing.

It will be apparent that a number of head units including core parts such as 601–605 may be associated with respective unitary housing parts such as indicated at **502*a* and 502*b* in FIG. 17. Magnetic or electrically conductive shielding members or both may be interposed between the successive head units in the same manner as indicated at 503 in FIG. 17. Further, one or more of the core legs, particularly those which do not require windings, in FIG. 17 or 20, may be common to all of the head units and extend through gaps in the shield members such as indicated at 503 in FIG. 17. Thus, in FIG. 17, the core leg 472 may be common to all the head units and the portions 472 and 472*a* in FIG. 17 would then be part of a single common core member which would extend through a suitable gap in the shield member 503**.

It will be apparent that the various circuit arrangements illustrated in any of the various figures generally may be applied to any of the core structures illustrated herein, and that the features of core configration and mounting described with respect to any embodiment generally may be applied to the other illustrated embodiments. It is further noted that the specific numerical examples of gap spacings, numbers of turns for windings and the like are generally applicable to any of the embodiments and are given simply by way of illustration and not of limitation.

With respect to each of the embodiments, it is preferable to have the pole between the cross field and recording gaps as thin as possible in the direction of tape movement thereacross subject to practical limitations of a mechanical nature and the need to avoid saturation of the pole during recording or inadequate flux carrying capacity during playback; for example, it is preferable to have the pole thickness equal to or less than two mils (.002 inch).

In each of the embodiments, the cross field gap may be defined by a gap spacer of beryllium copper having a thickness of .001 inch and the recording gap may be defined by a gap spacer of beryllium copper having a thickness of .00005 inch. The tape may have a magnetizable layer .0003 to .0005 inch thick in sliding contact with the successive poles. The pole between the cross field and erase gaps may have a thickness dimension in the direction of tape movement where it contacts the tape of .0005 inch.

By way of a further specific example and not of limitation, each of the embodiments may utilize an electric circuit as indicated in FIG. 8 with a winding 260 coupled to the cross field mangetic circuit including legs 20 and 21 having 1000 turns and a winding 729 having 1000 turns coupled to the record-playback magnetic circuit including legs 21 and 22. The winding 729 coupled to the record-playback magnetic circuit may be tapped at 48 turns from the top as indicated at 730 and may be tapped at 144 turns from the top as indicated at 731. Thus winding section 732 has 48 turns, winding section 261 has 96 turns and winding section 267 has 856 turns. During recording a high frequency bias current of 3.5 milliamperes at a frequency of 100,000 cycles per second is supplied to winding 260 and winding section 261 in series. Thus the bias supply would be connected between terminals 265 and 266 in FIG. 8. A recording signal having frequency components between 20 cycles per second and 20,000 cycles per second at 0.1 milliampere may be supplied between terminals 733 and 266 to energize winding 260 and winding sections 732 and 261 in series. Bias current would then flow in 96 turns of winding 729 while recording signal current would flow in 144 turns of winding 729. While in FIG. 8, the windings 260 and 729 are shown in aiding relation with respect to recording region 120, the example applies where the direction of winding 260 is reversed to provide signal and bias fields in region 120 which are in phase opposition to the signal and bias fields produced by winding 729. With the present example, the playback amplifier would be connected to winding 729 only.

When the circuit just described is applied to the embodiment of FIGS. 20–24, winding 260 would be placed on core part 640 and winding 729 placed on leg 605, for example.

As a further modification which will be practical in many instances, the winding 42 in FIGS. 1–6, the winding sections 246 and 247 in FIG. 7, 261 and 267 in FIG. 8, 271 in FIG. 9, 281 and 288 in FIG. 10, 301 and 308 in FIG. 11, and 364 and 380 in FIGS. 12 and 13 may be used alone for playback. This arrangement may be preferred for simplicity, especially where the head is proportioned and adjusted so that interference is negligible without the use of a compensating winding linking the cross field magnetic circuit.

Figure 1A:
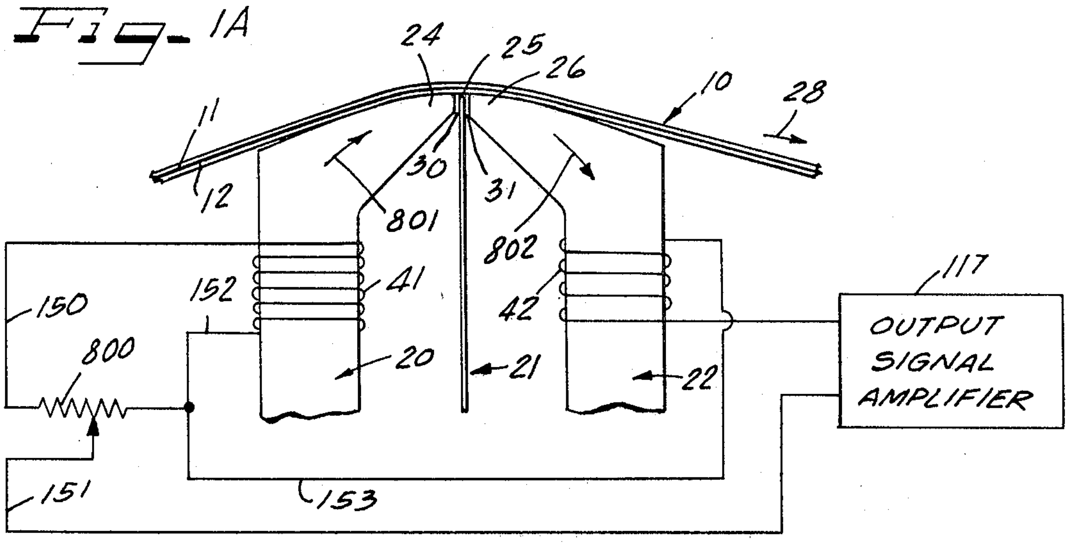
FIGS. 1A and 1B show specific circuit arrangements for the head of FIG. 1.
Figure 1B:
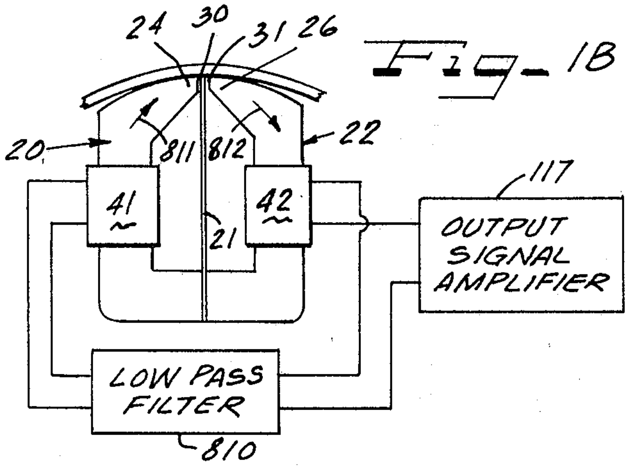

In FIGS. 1A and 1B, the parts are the same as described with reference to FIGS. 1–3, and corresponding reference numerals have been applied to the corresponding parts. FIG. 1A shows the case where the impedance means 111 of FIG. 1 comprises a potentiometer 800 which has its outer fixed terminals connected to lines 150 and 152 and has its movable contact terminal connected to line 151 and one of its outer terminals connected to line 153. It will be observed from FIG. 18 that when a recorded half wavelength is approximately equal to the separation between the magnetic centers of gaps 30 and 31, the signal at gap 31 of the head will generate a voltage of one polarity in the winding 42, while the signal at gap 30 may produce a stray flux linking winding 42 and producing a voltage of opposite polarity at the winding 42. The stray voltage induced in winding 42 in this manner produces a cancellation effect at this value of recorded wavelength as indicated by dip 212*a* in the response curve 212. Similar but less significant dips occur at sub-multiples of this critical recorded wavelength, a further dip being indicated at 212*b* in the response curve 212 of FIG. 18. It will be observed that for recorded wavelengths greater than the critical wavelength illustrated in FIG. 18, flux is produced in the circuit including legs 20 and 22 predominantly as indicated by arrows 801 and 802, and an opposing voltage is thus induced in winding 41 at these low frequencies. This opposing voltage, however, does not substantially affect the frequency response characteristics of the head as will be apparent from a comparison of curves 212 and 213 in FIG. 18. At substantially higher recorded wavelengths, it will be understood that the gap 30 is relatively ineffective to produce a voltage in winding 41, and thus it will be understood that connection of the winding 41 in series opposing relation to the winding 42 during playback will not appreciably affect the high frequency response of the head.

Referring to FIG. 1B, another way to use the head of FIG. 1 for playback is to connect coil 41 in series aiding relation with respect to coil 42 through a low pass filter 810. The long wavelengths will then generate additive voltages in windings 41 and 42 to give enhanced low frequency response. At higher frequencies represented by shorter wavelengths, only the output from winding 42 is effective so that a minimum of interference results. This mode of operation is especially desirable where stray coupling between gap 30 and winding 42 is low. The low pass filter 810 may also be used during recording to enhance low frequency recording by coil 41. With windings 41 and 42 connected in series aiding relation during playback, the two windings will produce aiding voltages in response to low frequency magnetic signal flux such as indicated at 811 and 812 linking the magnetic circuit including legs 20 and 22. The head will thus provide increased output at low frequencies. At higher frequencies including those corresponding to the critical recorded wavelengths, the voltage induced in winding 41 will be blocked in the low pass filter 810 and will not appear at output signal amplifier 117.

Figure 22A:
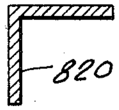
FIGS. 22A through 22F show views similar to that of FIG. 22 but illustrate modified core configurations for the head of FIG. 20.

FIGS. 22A through 22F illustrate modifications of the embodiment of FIGS. 20–24 which have been previously described. While in FIGS. 20–24, a channel or U cross section has been specifically shown for core parts 601–605, other cross sections will produce the advantages of larger flux carrying capacity with low eddy current loss. For example, FIG. 22A illustrates a L cross section at 820. A generally spiral cross section may be generally formed as illustrated at 821 in FIG. 22B and may be formed in an initially flat sheet by bending the sheet at right angles at successively increasing intervals. In this case the sheet is flat between successive right angle bends. The adjacent parallel portions of the sheet are suitably insulated to avoid forming a closed loop electric circuit for eddy currents.

Figure 22B:
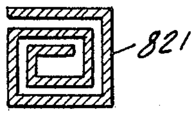
Figure 22C:
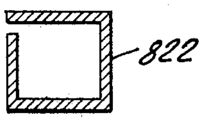

The core parts 601–605 of FIGS. 20–24 may also have a generally O cross section as indicated at 822 in FIG. 22C with flat sides similar to one convolution of the spiral type cross section of FIG. 22B. The free edges of the magnetic sheet formed into an O cross section have a non-conductive gap 823 therebetween to avoid a closed loop electric circuit for eddy currents.

Figure 22D:
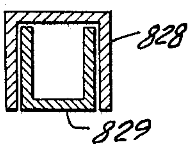

An O cross section may also be formed as in FIG. 22D by nesting the lateral flanges of a pair of oppositely directed strips 828 and 829 of channel cross section. The adjacent overlapping lateral flanges of the respective strips 828 and 829 are insulated from each other to avoid forming a closed loop electric circuit for eddy currents about the perimeter of the O cross section.

Figure 22E:
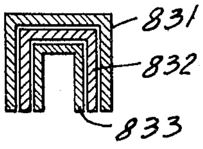
Figure 22F:
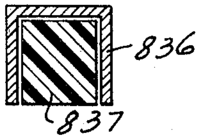

As a further example as illustrated in FIG. 22E, a series of channel cross section strips such as 831–833 of different size and all oriented in the same way are nested one within the other to form a large area C cross section. A channel or C cross section type core leg such as indicated at 836 in FIG. 22F may have a solid cross section non-magnetic filler 837 nested therein to rigidify the leg. The filler may be non-conductive or insulated from the core leg to avoid formation of an electrically conductive loop path about the perimeter of the square or rectangular cross section defined by the leg 836 and filler 837.

The spiral and O cross sections 821, 822 and 828, 829, for example, are advantageous over conventional laminated core parts because of their ease of assembly and relatively unstressed magnetic condition as finally assembled. The spiral and O cross section core parts are advantageous over solid cross section parts of comparable flux carrying capacity because of their reduced eddy current loss. The spiral and O cross sections provide more flux carrying capacity than a simple channel cross section, but are somewhat more difficult to fabricate and assemble. The non-magnetic filler 837 provides increased rigidity over the simple channel cross section core part.

It will be apparent that many modifications and variations may be effected without departing from the scope of the novel concepts of the present invention.

While maintaining the advantages of my previous Pat. No. 2,803,708, the present invention provides important new concepts which significantly improve the effectiveness of the recording and playback functions and make possible a simple low cost record-playback head assembly which is practical for use in medium and low priced recording machines. A head assembly in accordance with the present invention gives excellent distortionless low frequency response without the sacrifice of high frequency response at tape speeds of 1⅞ inches per second or lower. It allows the use of extremely short high resolution gaps which could not ordinarily be used for recording, and of relatively thick magnetic tape layers for high output and uniformity at medium and long wavelengths. A preferred construction utilizes a recording-playback assembly with a pair of gaps defined by a series of three poles across which the tape successively travels. Preferably a composite arrangement including outer strips of copper or other non-magnetic material and a center strip of magnetic material define the second or center pole between the two outer poles and the gaps at either side of the center pole. By this construction, the gaps are permanently and accurately located with respect to each other and may be made as close together as desired. The gap defining faces of the poles may be polished to high precision, and the three pole head may be assembled as readily as a conventional head.

The tape or other suitable record medium may travel first over a relatively large non-magnetic gap and then over a relatively fine gap suitable for high density recording or playback. In accordance with one embodiment of the present invention, the high frequency field across the first relatively large gap is not required to perform an erase function and thus may be precisely of optimum configuration and intensity for aiding in the recording function of the head assembly.

A preferred construction further provides means for applying the signal magnetomotive force at the outer pole adjacent the large gap so as to provide a relatively uniform signal field adjacent the small gap in the region where the bias field has a sharp gradient. Thus the signal field persists at substantially full strength as the bias field intensity falls off along the path of the tape beyond the small gap; this produces a recording of the signal field of greater intensity than is the case where the recording signal field and bias field are both attenuating at the same rate along the path of the tap beyond the small gap.

A further feature of the preferred embodiment resides in the provision of a metal casing for the transducer head made of a material having a thermal expansion coefficient similar to that of the core material of the head to provide a more stable gap configuration.

The present invention also makes possible the provision of an erase gap or gaps in the head assembly which may also be provided by a sandwich type construction for simplicity and so as to place the erase gap or gaps as close as possible to the recording section of the head to insure proper tracking of the tape over all of the gaps. A single head including provision for the erase function is economical and reduces problems of mounting and alignment between the erasing and recording sections. By the present invention the magnetic circuit between the erase and record sections may readily couple an optimum level of high frequency field from the erase section to the recording section.

Stereo or multiple heads may employ the concepts of the present invention. Thus two or more laterally spaced cores may cooperate with a larger area center pole arrangement common to all of the head units. Alternatively, separate center pole assemblies may be used for each head unit with shield members extending longitudinally of the tape path between the successive separate head units.

It is therefore an important object of the present invention to provide a novel and improved magnetic transducer assembly for magnetic record media providing higher resolution, better frequency response and less distortion at very low speeds or in high frequency applications.

A further object of the present invention is to provide a relatively simple and inexpensive transducer head for high density recording or playback applications.

Still another object of the present invention is to provide a novel magnetic recording head structure providing excellent distortionless low frequency response without sacrifice of fidelity at high frequencies and which is particularly adapted to low record medium speeds such as 1⅞ inches per second or less.

A further object of the present invention is to provide a novel magnetic transducer head having a gap configuration of great accuracy and stability.

A still further object of the invention is to provide a novel combined erase record and playback transducer assembly for use with magnetic record media and to provide a novel stereo or multiple head assembly having a common center pole configuration.

Other objects, features and advantages of the present invention will be apparent from the preceding detailed description taken in connection with the accompanying drawings.

I claim as my invention:

1. A magnetic reproducing system exhibiting low frequency emphasis in reproducing a recorded signal including relatively low signal frequencies and relatively high signal frequencies, from a magnetic record medium, said system including, a magnetic reproducing head having a magnetic core configured to define a coupling gap across which the path of the magnetic record medium extends in a longitudinal direction and to define a first magnetic circuit of loop configuration extending from one side of the coupling gap to the other and including a first magnetic core portion of said magnetic core, and to define a second magnetic circuit of loop configuration also extending from one side of the coupling gap and extending to a location at the record medium path which is spaced from the other side of said coupling gap in a direction away from said one side, and including a second magnetic core portion of said magnetic core, a first signal winding mounted on said first magnetic core portion of said magnetic core in inductively coupled relationship therewith, said first signal winding having a first terminal at which output signals appear and having a second terminal, a second signal winding mounted on said second magnetic core portion of said magnetic core in inductively coupled relationship therewith and having a substantially greater number of turns than said first signal winding, said second signal winding having a first terminal connected to a circuit point and having a second terminal, and impedance means connected from said second terminals of said first and second windings to said circuit point.

2. The system defined in claim 1 in which said impedance means comprises a low pass filter interposed between said second signal winding and a pair of output circuit points for effectively blocking the output from the second signal winding at the higher signal frequencies.

3. The system defined in claim 2 with the first terminal of the first winding connected to one of a pair of output circuit points, with the second terminal of said first winding connected to a first terminal of the low pass filter, and with the first terminal of the second winding connected to a second terminal of the low pass filter and with the other of said output circuit points.

4. A magnetic reproducing head for use in a magnetic reproducing system to enhance the low frequency response of the system, said head including a magnetic core configured to define a coupling gap across which a record medium path extends and define a magnetic pole piece for sliding engagement with a record medium moving along said record medium path, and to define a first magnetic circuit of loop configuration including a first magnetic core portion of said magnetic core of relatively low cross sectional area, said first magnetic circuit extending from one side of the coupling gap to the other, and to define a second magnetic circuit of loop configuration including a second magnetic core portion of said magnetic core of relatively high cross sectional area and extending in parallel with said first magnetic core portion with respect to a recorded signal at said coupling gap, said second magnetic circuit also extending from one side of the coupling gap and extending through said second magnetic core portion to said magnetic pole piece which is spaced from the other side of the coupling gap in a direction away from said one side, and having a part thereof coinciding with a part of the first magnetic circuit which part of said first magnetic circuit is substantially exclusive of said first magnetic core portion, a first signal winding mounted on said magnetic core in inductively coupled relationship with said first magnetic circuit, said first signal winding having circuit means connected therewith for effectively transmitting the output thereof at the higher signal frequencies to a pair of output circuit points, and a second signal winding mounted on said second magnetic core portion in inductively coupled relationship therewith and having a substantially greater number of turns than said first signal winding and having circuit means connected therewith for effectively transmitting the output thereof at the lower signal frequencies to the pair of output circuit points.

5. A magnetic reproducing system including a magnetic reproducing head having a magnetic core configured to define a coupling gap across which a record medium path extends and to define a magnetic pole piece for sliding engagement with a record medium moving along said record medium path, and to define a first looped portion extending from one side of the gap to the other and define a second looped portion also extending from one side of the gap and extending to said magnetic pole piece which is located at the record medium path in advance of said first looped portion with respect to the direction of movement of the record medium;

a high frequency signal winding mounted on said first looped portion of said gap in magnetically coupled relationship therewith, said high frequency signal winding having a first terminal at which output signals appear and having a second terminal;

a low frequency signal winding mounted on said second looped portion of said core in magnetically coupled relationship therewith and having a substantially greater number of turns than said first signal winding, said low frequency signal winding having one terminal connected to an output circuit point and having a second terminal; and resistance means connected from said second terminals of said low frequency and high frequency windings to said output circuit point.

6. A magnetic reproducing head for use in a magnetic reproducing system to correct the low frequency response of the system, said head including a magnetic core configured to define a coupling gap across which a record medium path extends and to define a magnetic pole piece for sliding engagement with a record medium moving along said record medium path, and to define a first looped portion including a first magnetic core portion of relatively low cross sectional area and extending from one side of the gap to the other and to define a second looped portion of relatively high cross sectional area also extending from one side of the gap and extending to said magnetic pole piece which is located at the record medium path in advance of said first looped portion with respect to the direction of movement of the record medium;

a high frequency signal winding mounted on said first looped portion in magnetically coupled relationship therewith; and a low frequency signal winding mounted on said second looped portion in magnetically coupled relationhip therewith and having a substantially greater number of turns than said first winding;

said first magnetic core portion of relatively low cross sectional area being distinct from said second looped portion, and said first looped portion including a second magnetic core portion of relatively high cross sectional area in common with said second looped portion and defining one side of said gap.

7. In a magnetic transducer assembly, a magnetic transducer head comprising magnetic core means having first, second and third core parts of magnetic material, said core parts having polar extremities disposed in spaced series relation along and to one side of a path of a magnetic record medium with a first non-magnetic gap between the polar extremities of the first and second core parts and with a second non-magnetic gap between the polar extremities of the second and third core parts for coupling of the head to a magnetic record medium traveling along said path and successively across said first and second gaps, first winding means encircling said first core part across which said record medium first travels as it moves along said path, second winding means encircling said third core part across which said record medium last travels as it moves along said path, signal output means for delivering an output signal, and electric circuit means for connecting at least a portion of said first and second windings to said signal output means in series opposing relation during playback for substantially cancelling a spurious voltage produced in said second winding means by signal flux from the portion of the record medium at said first gap.

said polar extremity of the first core part having sliding engagement with the record medium and said first gap being substantially larger than said second gap so as to provide a magnetic cross field component in air between said polar extremities of said first and third core parts during recording operation.

8. A magnetic reproducing system exhibiting low frequency emphasis in reproducing a recorded signal including relatively low signal frequencies and relatively high signal frequencies, from a magnetic record medium, said system including a magnetic reproducing head having a magnetic core configured to define a coupling gap across which the path of the magnetic record medium extends and to define a magnetic pole piece disposed in confronting relation to the record medium path, and to define a first magnetic circuit of loop configuration extending from one side of the coupling gap to the other and to define a second magnetic circuit of loop configuration also extending from one side of the coupling gap and extending to said magnetic pole piece which is located in advance of said first magnetic circuit with respect to the direction of movement of the record medium;

a first signal winding inductively coupled with said first magnetic circuit, said first signal winding having a first terminal connected to a first output circuit point and having a second terminal;

a second signal winding inductively coupled with said second magnetic circuit and having a substantially greater number of turns than said first signal winding, said second signal winding having a first terminal connected to a second output circuit point and having a second terminal connected to the second terminal of said first winding; and impedance means connected across said second winding.

9. A magnetic reproducing head for use in a magnetic reproducing system to enhance the low frequency response of the system, said head including a magnetic core configured to define a coupling gap and to define a first magnetic circuit of loop configuration, said first magnetic circuit extending from a leading side of the coupling gap to a trailing side thereof with respect to a direction of travel of a record medium along a record medium path across said magnetic core, and to define a second magnetic circuit of loop configuration, said second magnetic circuit also extending from the trailing side of the coupling gap and extending to a location in advance of the leading side of said coupling gap, and having a part thereof coinciding with a part of the first magnetic circuit;

a first signal winding mounted on said magnetic core in inductively coupled relationship with said first magnetic circuit, said first signal winding having circuit means connected therewith for effectively transmitting the output thereof at the higher signal frequencies to a pair of output circuit points; and a second signal winding mounted on said magnetic core in inductively coupled relationship with said second magnetic circuit and having a substantially greater number of turns than said first signal winding and having circuit means connected therewith for effectively transmitting the output thereof at the lower signal frequencies to the pair of output circuit points.

said first winding being mounted on said part of said second said magnetic circuit coinciding with a part of the first magnetic circuit.

10. A magnetic reproducing system including:

a magnetic reproducing head having a magnetic core configured to define a coupling gap and to define a first loop magnetic circuit extending from a leading side of the coupling gap to a trailing side thereof and to define a second loop magnetic circuit also extending from the trailing side of the coupling gap and extending to a location in advance of the leading side of said coupling gap, a high frequency signal winding coupled with said first loop magnetic circuit, said high frequency signal winding having a first terminal at which output signals appear connected to a first output circuit point and having a second terminal, a low frequency signal winding coupled to said second loop magnetic circuit and having a substantially greater number of turns than said first signal winding, said low frequency signal winding having one terminal connected to a second output circuit point and having a second terminal, and resistance means connected to said second terminals of said low frequency and high frequency windings and to said second output circuit point.

11. A magnetic playback system comprising a magnetic core having a pair of magnetic poles with a coupling gap therebetween for coupling with a magnetic record medium relatively movable along a record medium path extending successively across said poles and having a pole piece adjacent the record medium path, a first magnetic circuit extending in a loop between said poles and providing a path for relatively high frequency signal flux components from the record medium, a first winding inductively coupled with said first magnetic circuit and relatively closely coupled with relatively high frequency components of a recorded signal on the portion of the record medium at said coupling gap to provide an output in response to said relatively high frequency signal flux components, a second magnetic circuit including the trailing one of said pair of poles and extending to said pole piece which pole piece is disposed for coupling to the record medium in advance of the leading one of said poles with respect to the direction of movement of the record medium, said second magnetic circuit defining a signal flux path of loop configuration threading said first and second windings, and providing a path for relatively low frequency signal flux components from the recorded medium, a second winding having substantially more turns than said first winding and inductively coupled with said second magnetic circuit and relatively less closely coupled with relatively high frequency components of a recorded signal on the portion of the record medium at said coupling gap, and means for connecting said first and second windings in series opposing relation with respect to said signal flux path defined by the second magnetic circuit for cooperation in electrically reproducing a recorded signal including relatively high and relatively low frequency components.

12. A magnetic playback system comprising a magnetic core having a pair of magnetic poles with a coupling gap therebetween for coupling with a magnetic record medium relatively movable along a record medium path extending successively across said poles, a first magnetic circuit extending in a loop between said poles and providing a path for signal flux components from the record medium, a first winding inductively coupled with said first magnetic circuit, a second magnetic circuit including the trailing one of said pair of poles and providing a path for signal flux components from the record medium, a second winding inductively coupled with said second magnetic circuit, and means for connecting said first and second windings in series opposing relation with respect to signal flux for cooperation in electrically reproducing a recorded signal including relatively high and relatively low frequency components, the second magnetic circuit having a loop configuration including said coupling gap and threading both said first and second windings.

13. A magnetic playback system comprising a magnetic core having a pair of magnetic poles with a coupling gap therebetween for coupling with a magnetic record medium relatively movable along a record medium path extending successively across said poles, said core having a predetermined transverse dimension at the trailing one of said pair of poles, a first magnetic flux path extending in a loop between said poles and providing a path for relatively high frequency signal flux components from the record medium, a first winding having a relatively small number of turns inductively coupled with said first magnetic circuit to provide an output in response to said relatively high frequency signal flux components, a second magnetic flux path including the trailing one of said pair of poles and providing a path for relatively low frequency signal flux components from the record medium, a second winding having a substantially larger number of turns inductively coupled with said second magnetic circuit to provide an output in response to said relatively low frequency signal flux components, and means for connecting said first and second windings in series aiding relation through a low pass filter for cooperation in electrically reproducing a recorded signal including relatively high and relatively low frequency components, the second magnetic flux path being of magnetic material except for nonmagnetic gaps of a total length substantially less than the transverse dimension of the core.

References Cited

UNITED STATES PATENTS

| | | | |
|---|---|---|---|
| 2,538,405 | 1/1951 | Zenner | 179—100.2 |
| 2,540,711 | 2/1951 | Camras | 179—100.2 |
| 2,633,504 | 3/1953 | Beer | 179—100.2 |

FOREIGN PATENTS 1,036,529 8/1958 Germany.

TERRELL W. FEARS, Primary Examiner

J. R. GOUDEAU, Assistant Examiner

U.S. Cl. X.R.

340—174.1